Figure 1:
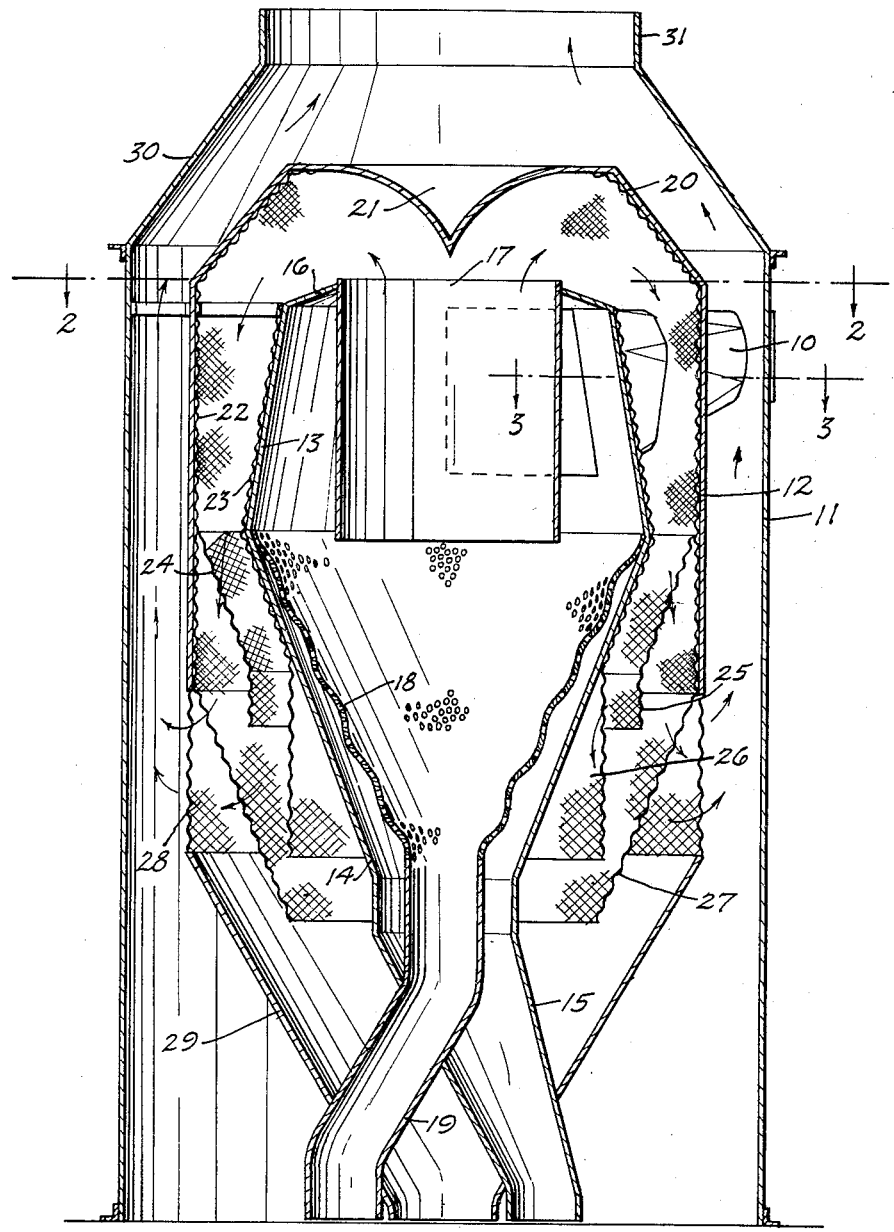

Sept. 26, 1933.  W. J. ALLAN  1,927,817
METHOD AND MEANS FOR SEPARATING COTTON LINT AND EXTRANEOUS MATTER
Filed April 6, 1931  2 Sheets-Sheet 1

Inventor
Walter J. Allan

By Jack Ashley
Attorney

Sept. 26, 1933.  W. J. ALLAN  1,927,817
METHOD AND MEANS FOR SEPARATING COTTON LINT AND EXTRANEOUS MATTER
Filed April 6, 1931  2 Sheets-Sheet 2
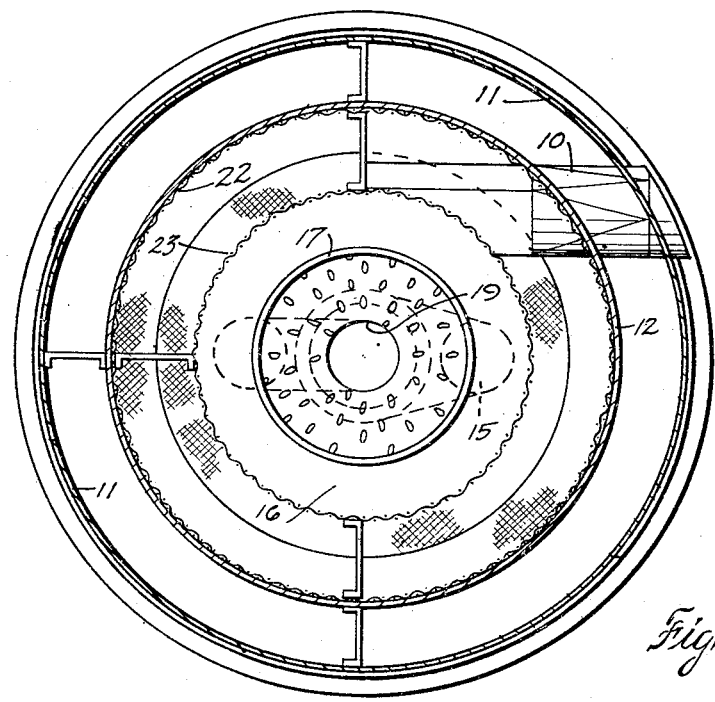
Fig. 2
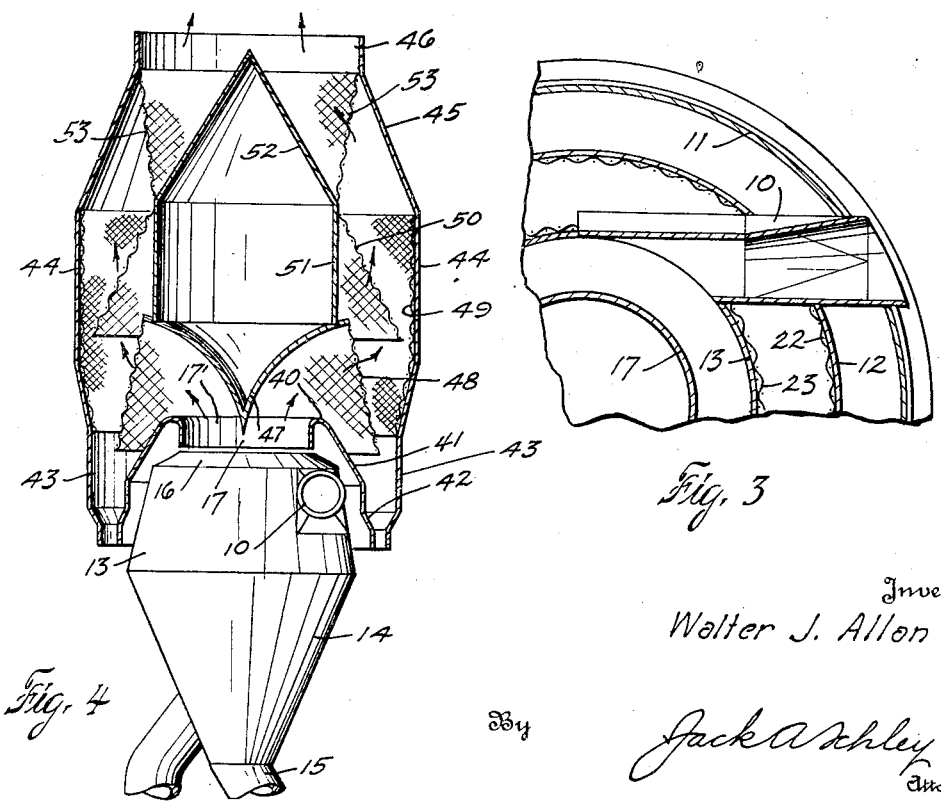
Fig. 3
Fig. 4
Inventor
Walter J. Allan
By
Jack A Ashley
Attorney Patented Sept. 26, 1933

1,927,817

UNITED STATES PATENT OFFICE 1,927,817

METHOD AND MEANS FOR SEPARATING COTTON LINT AND EXTRANEOUS MATTER

Walter J. Allan, Dallas, Tex.

Application April 6, 1931. Serial No. 528,126

3 Claims. (Cl. 19—75)

This invention relates to new and useful improvements in methods and means for separating cotton lint and extraneous matter.

The invention has particularly to do with the art of removing cotton lint or fibres from cotton seed hulls. It is customary in this art to break up or defibrate the hulls in a suitable machine and float or convey the lint or fibres out of the machine; while the broken or defibrated hulls are either settled out by gravity or conveyed from the machine separately from the lint or fibres.

One serious obstacle which is the cause of much trouble is that the lint or fibres which are discharged from the defibrating machine are laden with a substance known as "red dust". Where the lint is used in the production of rayon materials and the like, the red dust is a detriment because it is non-cellulose and it is advantageous to extract this red dust, which is a difficult operation under present methods.

One object of the invention is to provide a method whereby cotton seed hulls may be defibrated and the red dust and other extraneous matter separated from the usable lint by a substantially continuous operation.

Another object of the invention is to provide a separating method whereby the lint and heavier particles of dust and extraneous matter are separated by a cyclonic action, discharged by gravity, the red dust and extraneous matter floated from the cyclonic separation, and a secondary separation carried out wherein the red dust and extraneous matter is extracted from the air currents. The result of this method is that the maximum amount of usable lint is produced free from red dust and objectionable extraneous particles and substantially clean air is discharged into the atmosphere.

A further object of the invention is to provide separating means including a primary separator for segregating the usable lint and the heavier extraneous matter and carrying off the red dust and lighter extraneous matter, and a secondary separator for extracting the red dust and lighter extraneous matter, whereby relatively clean air may be discharged.

Another object of the invention is to provide means for deflecting and screening the dust laden air currents rising from a cotton lint and dirt separator, for extracting the red dust, fine lint and other light extraneous matter from said currents.

A construction designed to carry out the invention will be hereinafter described together with other features of the invention.

The invention will be more readily understood from a reading of the following specification and by reference to the accompanying drawings in which an example of the invention is shown, and wherein:

Figure 1 is a vertical sectional view of a separating device constructed in accordance with the invention, Figure 2 is a horizontal cross-sectional view taken on the line 2—2 of Figure 1, Figure 3 is a horizontal cross-sectional view taken on the line 3—3 of Figure 1, and Figure 4 is a vertical sectional view of a modified form of the invention.

In the drawings the numeral 10 designates an inlet or influent spout which receives the lint from the defibrating machine which may be of any suitable structure. The spout 10 may be connected with the pipe s of the machine shown in the patent issued August 20, 1929, No. 1,725,013, or to any other source.

The spout 10 passes through an outer cylindrical jacket or shell 11 and an inner cylindrical sheet 12 and connects tangentially with the frusto-conical casing 13 of a cyclone separator. The casing is mounted on an inverted conical hopper 14 having a tapered discharge spout 15 extending from its bottom at an angle to its vertical axis.

An upwardly inclined collar 16 carried on the upper edge of the casing 13 extends inwardly and is fastened around the upper end of a cylindrical baffle sleeve 17 depending axially in the casing to a point below the spout 10. A hopper screen 18 hanging in the hopper 14 has its upper annular edge supported at and in contact with the intersection of the casing and said hopper. This screen is preferably corrugated annularly and has a less pitch than the hopper 14, whereby it is spaced from the hopper walls and its bottom end is reduced. A vertical discharge pipe 19 leads downwardly from the bottom of the screen 18 and passes through the discharge spout 15. The parts 13, 14, 15, 16, 17 and 18 constitute a cyclone separator.

The shell 12 surrounds the casing 13 and the hopper 14 and is spaced therefrom to form a separating space therebetween. A frusto-conical hood 20 mounted on the upper edge of the shell supports a deflector 21 overhanging the baffle 17 and the collar 16 for deflecting the air currents which rise from the baffle 17. The shell and hood have a foraminous lining 22.

The dust laden air currents which pass upward from the baffle 17 are cast outwardly by the deflector 21 and are carried downwardly in the shell 12. These currents are scrubbed against the lining 22 which tends to extract red, fine lint and other particles from the air currents. A foraminous jacket 23 is fitted on the outer surface of the casing 13 and the upper portion of the hopper 14 and forms an additional scrubbing means.

A hopper screen 24 is suspended from the lining 22 opposite the upper end of the hopper 14 and has a short annular apron 25 hanging from its lower end. A foraminous skirt 26 hangs from the lower end of the jacket 23 and surrounds the lower portion of the hopper 14. The lower end of the lining 22 terminates at the lower edge of the shell 12 and a lower hopper screen 27 hangs from the lining around the apron and the skirt.

An annular screen 28 connects the bottom of the shell 12 with the top of a hopper 29. This hopper is shaped to discharge between the spout 15 and the pipe 19 which extend through it. The lining 22, jacket 23, hoppers 24 and 27, apron 25, skirt 26 and screen 28 may be made of any foraminous material suitable for the purpose, but very satisfactory results have been secured by the use of small mesh hardware cloth, wire fabric and similar screening material.

The dust laden air currents passing down between the lining 22 and jacket 23 are agitated and dust and other matter scrubbed out. These currents pass on through the screen 24 and screen 27 and escape through the screen 28. Extracted dust, lint and particles will work their way downward passing over and through the various screens and finally being collected in the hopper 29. The screens and foraminous members may vary in mesh. For instance the hoppers 24 and 27 may be comparatively coarse in mesh so as to permit a free passage of air, while the skirt 26, jacket 23 and lining 22 may be of a smaller mesh.

The purpose of the screens and foraminous elements is to scrub and extract the dust, fine lint and other extraneous matter, whereby substantially clean air will be delivered into the annular channel between the shell 12 and the outer jacket 11. The jacket 11 extends from the bottom of the hopper 29 and carries a transition 30 on its upper end which surrounds and extends above the hood 20. A collar 31 is formed on the upper edge of the transition and opens to the atmosphere through a wind or draft deflector (not shown) which prevents any down draft.

In operation the dirty and dust laden lint from the defibrating machine is discharged tangentially into the casing 13 by the spout. This matter is blown into the casing with a considerable volume of air and consequently whirled around therein. In passing over and around the corrugations of the hopper 18 the lint cotton is freed of the heavier particles of dirt and extraneous matter, so that the lint is discharged through the pipe 19 and the other matter escapes through the perforations of the hopper 18 into the spout 15 from which it may be carried off by any suitable conductor.

The whirling and agitation of the lint causes the red dust, fine lint particles and other light extraneous matter to rise or float upward in a cloud or to be carried by the air currents from the hopper 18 into the baffle 17. The dust laden air currents striking the deflector 21 are cast outwardly and induced to flow downwardly by reason of the outlet screen 28. The air currents passing between the lining 22 and jacket 23 and through the hopper screens 24 and 27 will be robbed of red dust, fine lint, etc., and after being thoroughly scrubbed will be discharged into the jacket 11. In passing up the jacket and through the transition 30 a final scrubbing will be given.

It will be seen that the cotton lint fibres which are discharged from the pipe 19 will be clean and substantially free from non-cellulose matter. The heavier dirt will be taken care of. The red dust, fine lint, etc., will be extracted and substantially clean air will be discharged into the atmosphere.

The method may be formed in various ways and as a further illustration I have shown in Figure 4 another form wherein the dust laden air currents are carried upwardly instead of downwardly. The same cyclone separator comprising the spout 10, casing 13 and hopper 14, is used for the primary or major separation. The baffle 17 is provided with an extension 17' which has a rolled over annular lip 40 at its top merged into a downwardly and outwardly inclined apron 41.

The inner wall of an annular dust trough 42 is made integral with the apron. The trough has an annular upright outer wall 43 surrounding the apron. The bottom of the trough is contracted and suitable means (not shown) is provided for carrying off the dust, fine lint, etc. The wall 43 constitutes the support for an upright cylindrical shell 44 having a transition 45 at its top surmounted by a collar 46.

A deflector 47 similar to the deflector 21 is centrally suspended over the extension 17' and the dust laden air currents are cast outwardly as they rise from the cyclone separator, against a frusto-conical screen 48 hanging from the outer edge of the deflector and overhanging the apron 41. This screen will arrest considerable of the dust, etc., which will be diverted into the trough 42.

The air currents which pass through the screen 48 will either scrub against a screen lining 49 on the inner wall of the shell or pass through a downwardly flared skirt screen 50 carried by a central sleeve 51 having its lower edge attached to the deflector. A conical baffle 52 extends upwardly from the sleeve within the transition 45. An annular outlet screen or guard 53 extends down from the collar 46 to the top of the screen 50.

The air currents passing upwardly either through or around the skirt 50 will be scrubbed either by said skirt or the lining and will finally pass through the screen 53. Red dust and other extraneous matter will be shed downwardly by the inclinations of the members 48, 50 and 53 so that substantially clean air will be discharged to the atmosphere from the collar 46. The terms lint and fibres are used interchangeably herein.

Various changes in the size and shape of the different parts, as well as modifications and alterations, may be made within the scope of the appended claims.

Having illustrated and described preferred forms of the invention, what I claim, is:

1. In a device for treating cotton fibres, a cyclone separator, a dust passage leading from the top of the separator, a deflector over the cyclone separator, a shell into which the dust laden air currents are directed by the deflector, screen elements in said shell in the path of said air currents, and a dust collecting receptacle connected with the shell below the screen elements.

2. A device as set forth in claim 1, in which the cyclone separator has a foraminous hopper for receiving the fibres and an imperforate hopper.

3. In a device for treating cotton fibres, a frusto-conical casing, a spout entering said casing tangentially, a hopper extending downwardly from the casing, a cylindrical baffle extending axially of the casing open at each end and discharging through the top of the casing, a foraminous hopper in the first hopper, a deflector over the baffle, a shell communicating with the baffle, a foraminous lining in the shell, screen elements in the shell, said shell having a dust receptacle at its lower end and a discharge opening at its upper end.

WALTER J. ALLAN.